(12) United States Patent
Liu et al.

(10) Patent No.: US 6,585,930 B2
(45) Date of Patent: Jul. 1, 2003

(54) METHOD FOR ARTICLE FABRICATION USING CARBOHYDRATE BINDER

(75) Inventors: Jianxin Liu, Westmoreland County, PA (US); Michael Rynerson, Westmoreland County, PA (US)

(73) Assignee: Extrude Hone Corporation, Irwin, PA (US)

( * ) Notice: Subject to any disclaimer, the term of this patent is extended or adjusted under 35 U.S.C. 154(b) by 0 days.

(21) Appl. No.: 09/842,618

(22) Filed: Apr. 25, 2001

(65) Prior Publication Data

US 2002/0189405 A1 Dec. 19, 2002

(51) Int. Cl.$^7$ .................................................. B22F 3/10
(52) U.S. Cl. ............................... 419/7; 429/26; 429/65
(58) Field of Search ............................... 419/36, 37, 26, 419/7, 65

(56) References Cited

U.S. PATENT DOCUMENTS

| | | | |
|---|---|---|---|
| 3,989,518 A | * 11/1976 | Ruecki | |
| 4,863,538 A |   9/1989 | Deckard | 156/62.2 |
| 5,204,055 A | *  4/1993 | Sachs et al. | 419/2 |
| 5,697,043 A | * 12/1997 | Baskaran et al. | 419/30 |
| 5,746,957 A | *  5/1998 | Fanelli et al. | 264/109 |
| 5,807,437 A |   9/1998 | Sachs et al. | 118/688 |
| 5,902,441 A | *  5/1999 | Bredt et al. | 156/284 |
| 5,914,185 A | *  6/1999 | Shoher et al. | 428/323 |
| 5,925,405 A | *  7/1999 | Ali-Khan | 427/180 |
| 5,997,603 A | * 12/1999 | Noro et al. | 75/228 |
| 6,126,873 A | * 10/2000 | Zedalis et al. | 264/28 |
| 6,171,360 B1 | *  1/2001 | Suzuki et al. | 75/255 |
| 6,264,863 B1 | *  7/2001 | Schwartz et al. | 264/109 |

OTHER PUBLICATIONS

Svec, J.J. et al., *Electronic and Newer Ceramics*, Industrial Publications, Inc., 1959, pp. 78 and 129–132.
Helen Jean Yoo, *Reactive Binders for Metal Parts Produced by Three Dimensional Printing*, Thesis submitted to Department of Mechanical Engineering, Massachusetts Institute of Technology, 1997, pp. 1–106.

* cited by examiner

Primary Examiner—Ngoclan Mai
(74) Attorney, Agent, or Firm—Webb Ziesenheim Logsdon Orkin & Hanson, P.C.

(57) ABSTRACT

A binder, and a method of using it in conventional powder metallurgy processes and solid free form fabrication including metal powder, or combinations of metals and ceramics, in which the binder contains at least one carbohydrate as the active binding compound. The carbohydrate generally contains between 6 and about 900 carbon atoms and may be selected from various categories including but not limited to: 1) monosaccharides; 2) disaccharides; 3) trisaccharides; and 4) polysaccharides containing the base sugars identified in 1)–3) above; and 5) hydrolyzed starches in which the hydrolysate contains between about 6–900 carbon atoms, including dextrins such as limit dextrin, hydrolyzed amylose, and hydrolyzed amylopectin. The amount of carbohydrate in the binder solution is generally on the order of about 5–50 grams carbohydrate per 100 ml of carrier solution, more preferably 5–30 g/ml, and most preferably 15 g/ml (or comparable amounts on a dry basis).

31 Claims, 3 Drawing Sheets

METHOD FOR ARTICLE FABRICATION USING CARBOHYDRATE BINDER

This invention was made with United States Government support under Program 70NANB7H3030 awarded by NIST. The Government has certain rights in this invention

FIELD OF THE INVENTION

The present invention relates to the binders used in conventional powder metallurgy processes and in the three-dimensional fabrication processes known as "Solid Free Form Fabrication" processes.

BACKGROUND OF THE INVENTION

The manufacture of metal dies and parts or molds for plastic injection molding may be produced by one of several conventional processes, including a process in which steel is machined into a desired mold shape and size by machine tool, by precision casting, or by special processing in which the mold material is treated by chemical etching or electrical spark discharge to attain a desired shape. These processes require complex manufacturing steps, highly skilled personnel and a great deal of time and, accordingly, are very expensive. Rapid manufacturing is a state-of-the-art method for producing parts and tooling quickly and automatically using a machine, which directly uses data from 3D CAD models or other sources of 3D geometry information to build a complete article in a layer-by-layer manner. There are two patented examples of rapid manufacturing or prototyping technologies which use powder materials to build articles. The three-dimensional printing process is described in U.S. Pat. No. 5,807,437 and the selective laser sintering process is described in U.S. Pat. No. 4,863,538, each of which is incorporated herein by reference.

Solid free form fabrication allows the creation of solid articles having interior channels and other structures or voids that would be impossible to cast by conventional molding or casting techniques. Many different materials may be used in the ultimate fabrication, including ceramics, metals and metal/ceramics, but the most useful typically are the steel and other metal or composite alloys which can be created by (1) binding metal or metal/ceramic powders in the desired three-dimensional construct; (2) sintering the bound particles; and (3) infiltrating into the sintered construct additional molten metals such as molten copper, molten bronze, etc.

The present invention is directed to a choice of binder to enhance the overall performance of previously known solid free form fabrication methods of all types. These methods include, but are not limited to, selective laser sintering, laminated object manufacturing, fused deposition modeling, precision optical manufacturing, directed light manufacturing, light engineered net shaping, three-dimensional printing, and others. Many of these processes have already been disclosed in, for example, the above-cited and other United States Patents. Typically, three-dimensional printing proceeds similarly to ink-jet printing, but instead of ink a binder is printed onto a powder layer following a computer pattern that is obtained by applying a slicing algorithm to the computer model of the article.

A challenge in most or all of these prior art processes has been the handling of the construct after binding but prior to sintering. Bound constructs not yet sintered are generally referred to as "green," in accordance with historic usage in the ceramics industry. For example, when metal or metal/ceramic composite powders are deposited layer-by-layer in a three-dimensional printing process, an acrylic polymer solution or emulsion is typically used as the binder layer as multiple alternating layers of powder and binder are deposited. Acrylic polymers, however, as is typical of many polymers, disintegrate at about 500 degrees C. The use of acrylic polymer binder thus dictates that the binding step itself can be conducted at a temperature no higher than about 500 degrees C. Typically, therefore, the green constructs bound with acrylic binder are fragile enough to warrant exceedingly careful handling, because at temperatures lower than about 500 degrees C. typically no particle fusion has begun at all and the construct is held together only by the cured binder. Breakage or damage of green constructs must be carefully avoided due to their relative fragility. Also, it is believed that the heat-deteriorated polymer binder—if anything is left of it at all after sintering—does not contribute ultimately to the strength or quality of the final sintered and infiltrated product. An ideal binder composition would not only improve the green strength of the construct but also its ultimate strength and other alloy characteristics. An additional consideration in the selection of binders for solid free form fabrication processes is whether the binder composition is shelf stable and safe, that is, whether it poses a materials safety problem or generates any hazardous waste.

SUMMARY OF THE INVENTION

In order to meet this need, the present invention is a binder, and a method of using it in solid free form fabrication including metal powder, in which the binder contains at least one carbohydrate as the active binding compound. The carbohydrate generally contains between 6 and about 900 carbon atoms and may be selected from various categories including but not limited to: 1) monosaccharides such as the aldose and ketose sugars and their glycoside, hydroxyl, methyl, acyl, carbonyl, phosphate, deoxy, amino and other derivatives; 2) disaccharides such as sucrose, maltose, lactose, dextrose, cellobiose, gentiobiose, and trehalose; 3) trisaccharides such as raffinose and melezitose; 4) polysaccharides containing the base sugars identified in 1)-3) above; and 5) hydrolyzed starches in which the hydrolysate contains between about 6–900 carbon atoms, including dextrins such as limit dextrin, hydrolyzed amylose, and hydrolyzed amylopectin. Carbohydrates which form isomers may be in either D- or L-form. In general, the carbohydrate is usually dissolved or dispersed (i.e., hydrated micelles) in an aqueous carrier solution but any carrier may be used as long as the carbohydrate can be distributed therein.

DETAILED DESCRIPTION OF THE INVENTION

Figure 1:
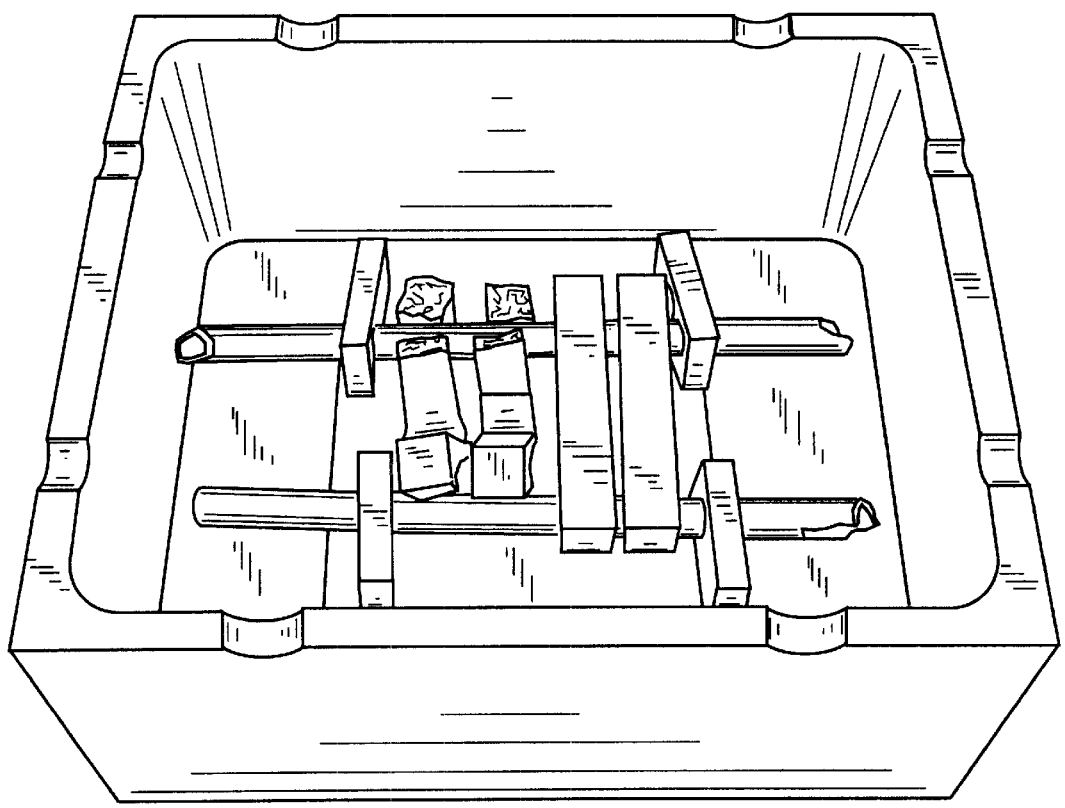
FIG. 1 is a photograph which shows two broken acrylic binder containing test bars on the left and two intact sugar water containing test bars on the right and FIGS. 2 and 3 show the actual inter-particle binding formation ("neck") made possible by the present invemtion.

The present invention is a binder, and a method of using it in conventional powder metallurgy processes and in solid free form fabrication using metal powder, in which the binder contains at least one carbohydrate as the active binding compound. The carbohydrate generally contains between about 6 and about 900 carbon atoms and may be selected from various categories including but not limited to: 1) monosaccharides such as the aldose and ketose sugars and their glycoside, hydroxyl, methyl, acyl, carbonyl, phosphate, deoxy, amino and other derivatives; 2) disaccharides such as sucrose, maltose, lactose, dextrose, cellobiose, gentiobiose, and trehalose; 3) trisaccharides such as raffinose and melezitose; 4) polysaccharides containing the base sugars identified in 1)–3) above; and 5) hydrolyzed starches in which the hydrolysate contains between about 6–900 carbon atoms, including dextrins such as limit dextrin, hydrolyzed amylose, and hydrolyzed amylopectin. Carbohydrates which form isomers may be in either D- or L-form. In general, the carbohydrate is usually dissolved or dispersed (i.e., hydrated micelles) in an aqueous carrier solution but any carrier may be used as long as the carbohydrate can be distributed therein.

The amount of carbohydrate in the binder solution is generally on the order of about 5–50 grams carbohydrate per 100 ml. of carrier solution, more preferably 5–30 grams per 100 ml., and most preferably about 15 g. per 100 ml. It is not necessary for the purpose of the present invention, however, that the carbohydrate be initially dissolved or dispersed in a carrier at all. If the solid free form process does not use a liquid binder or need not necessarily do so, then the use of comparable amounts of dry carbohydrate as the active binding compound will still fall within the scope of the present invention. Most preferred, as the carbohydrate of choice, is one of the ordinary table sugars, such as sucrose, maltose, dextrose, lactose and the like, because they are inexpensive, easily available and safe.

The present invention gives new and unexpected results by virtue of the dual use of a carbohydrate binder and a metal powder in the solid free form fabrication process. Carbohydrate binders were not unknown in the traditional ceramics industry, see for example, Svec, J. J. et al., *Electronic and Newer Ceramics,* Industrial Publications, Inc., Chicago, Ill., U.S.A., 1959, p. 78 and pp. 129–132. As described by Svec et al., traditionally wood pulp or other cellulose compositions were used to prepare conductive coatings on ceramic articles, and dextrin, gum arabic and the like were used to bind green ceramic articles made of aluminum oxide. However, Svec et al. do not teach or suggest—or even address—the improvement of solid free form fabrication by introducing carbohydrate binders or the new and unexpected results attributable to the presence of the carbohydrate carbon in the final product. Svec et al. likewise do not teach the important ratios (or percentages) of carbohydrate to carrier present in the binders of the invention, or percentages of carbohydrate carbon in the final product. In theory, although there is no intention of being bound by this theory, for ferrous constructs the residual carbon originating from the carbohydrate and remaining after sintering contributes to enhanced carbide bonds in the alloy formed after sintering and/or infiltration.

In context, the use of the present liquid carbohydrate binder solution proceeds as follows. A CAD design is developed and governs the deposition of layers of binder. Although the binder is deposited according to the design, the layers of metal or metal/ceramic powder are deposited evenly over the entire fabrication cavity surface. The powder may be, for example, an elemental metal, a metallic alloy, a cermet, an intermetallic or another metal/ceramic composite, or a pure ceramic. By building up alternating layers of selectively deposited binder and whole layers of powder, the support gained from the resultant powder bed enables overhangs, undercuts and internal volumes to be created. For example, tools with internal cooling channels can be printed integral with the article. This flexibility allows for the creation of very complex cooling channels into molds created by free form fabrication, to ensure more uniform temperatures during the molding process. Uniform temperatures in turn promote less thermal distortion and less internal stress, which in turn increase quality and reduce production time of the parts to be molded.

Powders as described above can include, for example, iron and alloys of iron, steels such as tool steel and stainless steel, copper and copper alloys, zirconia, cemented carbides, aluminum nitride, silicon nitride, silicon carbide, and any of the traditional ceramics. The atmosphere for deposition of the layers is typically air. After deposition of the layers, a typical powder pre-form may include from about 30–75% by volume powder, about 10% by volume binder, and the remainder of the volume void space.

After deposition of the alternate layers of binder and metal powder, the entire powder bed is pre-cured or fired at temperatures of between about 0–500 degrees F., more preferably 350–500 degrees F., in an atmosphere ordinarily of air. This firing step creates a green construct having greater green strength than green constructs of the prior art prepared with polymer binders. It is important to note that polymer binders such as acrylic binders normally decompose at about 500 degrees C., so that the binding strength of a typical polymer binder reduces to about zero at about 500 degrees C. However, the binding strength of the carbohydrate binders of the present invention, particularly the simple mono- and disaccharide sugars, increases with temperature even up to and including typical sintering temperatures. As a result, the present carbohydrate binder need not be removed from the construct at any point during the firing, sintering or infiltration processes. It is believed that after the pre-curing step, predominantly only carbon remains between the particles of the green article. Also, the gases evolved during pre-curing are completely safe and non-hazardous, and are characteristic of the gases resulting from a carmelization process performed at a confectioner's or in a commercial bakery.

After pre-curing, the construct is removed from its powder bed and embedded in a powder bed of refractory (ceramic) particles. This refractory bed is then transferred to the furnace where sintering takes place in a protective atmosphere. Sintering temperatures may vary depending upon the components of the metal or metal/ceramic composite powder used to fabricate the green article. Typical sintering temperatures for ferrous materials are approximately 2000–2400 degrees F. The protective atmosphere is typically an inert gas, or vacuum; the protective atmosphere may be any which reduces or eliminates oxidation.

After sintering, typically the sintered article is infiltrated with additional molten metal. The interstices of the sintered article actually exert a capillary action on molten metal, which in turn "wicks" into the article to create a solid metal article after infiltration and cooling. The molten metal is selected to have a melting point lower than the melting point of the sintered article, with the infiltration temperature being about 20–50° F. higher than the melting point of the infiltrant. For example, for infiltration of a stainless steel powder pre-form with tin bronze, (copper containing 10% by weight tin), the infiltration temperature is about 2,000–2,030° F. Infiltration is carried out under a protecting atmosphere as described above. The result is a fully dense component which may require additional finishing appropriate to the desired surface finish.

The above description of separate sintering and infiltration is one of many choices in the implementation of the present method. One-step infiltration, and sintering to full density without infiltration, and infiltrating with a nonmetallic substance such as a polymer, epoxy or wax are also options in the practice of this invention. For one-step infiltration, the fired powder pre-form is directly infiltrated with tin bronze under a protecting atmosphere at the temperature between 2,000–2,030° F. Sintering to full density without infiltration can also be accomplished by extending the time of sintering to promote fusion of the sintered particles to the extent of eliminating the interstices therein. Sintering to full density typically involves shrinkage to about 60% of the powder pre-form size by volume.

In general, the features of the invention are applicable to any metal-containing or ceramic material that can be obtained as a powder. Table 1, below, shows sugar-water binders with differing sugar/water ratios and the resulting sugar content in the printed powder pre-forms and the carbon content after firing. The most beneficial applications incorporating the present carbohydrates are those employing metal particles with carbon reducible oxygen content. Carbon reducible oxygen is meant to include those metal oxides which are capable of being reduced by carbon. Various forms of iron oxide as well as the oxides of nickel, copper, molybdenum and, etc. are reducible at temperatures below about 2,400° F. The carbon residue of the carbohydrate binder forms, and encourages the formation of carbide bonds in the final metal alloy.

TABLE 1

| Binder: sugar in gram/100 ml water | Sugar weight percent in preform | Carbon weight percent after firing |
|---|---|---|
| 70 | 1.98 | 0.76 |
| 60 | 1.79 | 0.69 |
| 50 | 1.58 | 0.61 |
| 40 | 1.35 | 0.52 |
| 30 | 1.08 | 0.42 |
| 25 | 0.93 | 0.36 |
| 20 | 0.77 | 0.30 |
| 15 | 0.60 | 0.23 |
| 10 | 0.41 | 0.16 |
| 5 | 0.22 | 0.08 |

The amount of sugar or other carbohydrate dissolved or suspended in the water or other carrier is important to the present invention. In general, approximately 5–50 grams of carbohydrate is dissolved in 100 ml of water to create the present binder solutions. Preferably, the carbohydrate is present in the amount of 5–30 grams/100 ml, more preferably 10–20 grams/100 ml and most preferably the present carbohydrate solutions include 15 grams per 100 ml solution. As described above, the most preferred carbohydrates are the ordinary table sugars including sucrose, maltose, dextrose, and lactose dissolved in water. It is believed that prior art efforts to use sugar as a binder in three dimensional printing was unsuccessful due to the incorporation of too much sugar in the binder composition. For example, in Yoo, H. J., "Reactive binders for metal parts produced by three dimensional printing," Thesis submitted to the Department of Mechanical Engineering, Massachusetts Institute of Technology, May, 1997, a solution containing approximately 80 grams table sugar in 100 ml water was ineffective as a binder for metal parts produced by three dimensional printing. The Yoo disclosure (incorrectly) identified observed shrinkage as attributable to the presence of the sugar.

In contrast to the Yoo teachings, however, the present invention allows preparation of articles in which reduced shrinkage occurs, thus giving better accuracy in the fabrication process. When prior art acrylic binders are used in the solid free form fabrication of metal articles, the acrylic binder accounts for a portion of the shrinkage based on the volume of the green article. When the present carbohydrate binder is used to manufacture metal articles by solid free form fabrication, the shrinkage is only on the order of about 0.05% by volume.

Although the invention disclosure provided above emphasizes the binder deposition typical of three dimensional printing, the carbohydrate binders of the present invention are applicable to all solid free form fabrications and indeed to any fabrication process incorporating powders. Thus, the present invention also benefits slip casting, powder injection molding, conventional powder metallurgy processes and other processes related to powder and binder systems. Slip casting is a process used in the production of articles from metal, alloy, ceramic, cermet and other metal-containing powders. The powder material is mixed with liquid binder to form a slurry, which is poured into plaster molds, where the surplus liquid is absorbed and a solid replica of the inside of the mold is obtained. The present invention prevents the pre-form made by slip casting from breaking or distorting during the post process. Powder injection molding is a process similar to plastic injection molding, but the feed stock includes elemental or pre-alloyed metal or metal-ceramic powders and binders. When the present invention is applied to powder injection molding, the same sugar water or other carbohydrate solution may be used in place of traditional powder injection molding binding compositions.

It is not necessary in the practice of the present invention that the binder be a liquid. In any fabrication technique using metal or metal/ceramic powders, the carbohydrate binder may be introduced as a dry constituent assuming that the method in question accommodates fabrication from dry ingredients. In the event that no aqueous solution or other carrier is used for the carbohydrate binder, representative carbon weight percents after firing may be determined in accordance with the above Table 1.

The following Example is illustrative.

EXAMPLE 1

A stainless steel powder was selected which passed 140 mesh but did not pass 325 mesh and had the following screen analysis.

| Mesh Size | Micron Size | Accumulate Percent Retained |
|---|---|---|
| 140 | 106 | 99.9 |
| 170 | 90 | 93.0 |
| 230 | 63 | 50.0 |
| 325 | 45 | 4.1 |

A quantity of the above-identified stainless steel powder was printed into several 0.5"×0.5"×4" test bars in layers, alternating with layers containing 10 g. sugar in 100 ml water. Several additional test bars were prepared using the same layer dimensions alternated with layers of traditional, commercially available acrylic binder solution. The sugar-water containing test bars were fired at 400° F. for two hours. The test bars containing the acrylic binder were allowed to cure at room temperature for about two hours. All of the test bars were then heated at 950° C. for thirty minutes. The sugar-water containing test bars retained their shape, whereas the acrylic binder containing test bars broke into pieces. FIG. 1 is a photograph which shows two broken acrylic binder containing test bars on the left and two intact sugar water containing test bars on the right.

Scanning electron microscopy was used to examine the fractured surface of inventive test bars prepared according to the above.

Figure 2:
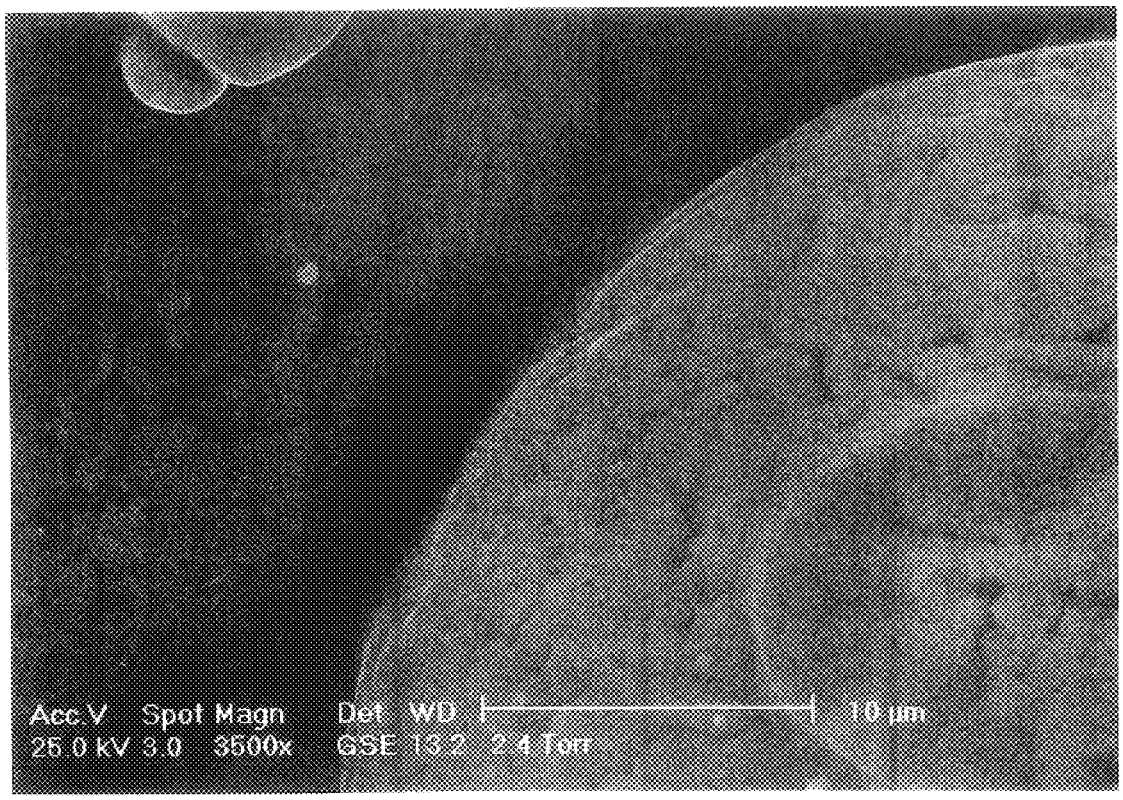
Figure 3:
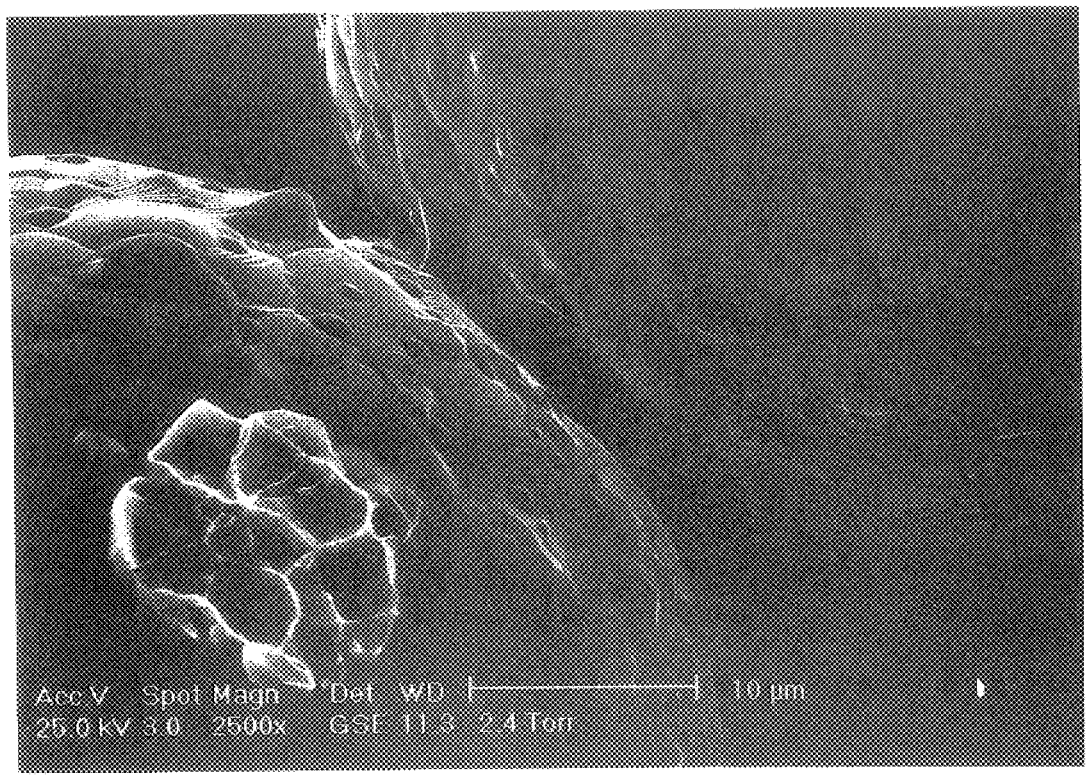

FIGS. 2 and 3 show the actual inter-particle binding formation ("neck") made possible by the present invention. FIG. 2 shows the neck of 316 stainless steel powder printed with 10 g/100 ml sugar water binder and fired at 400° F. for two hours in air. FIG. 3 shows the neck of 316 stainless steel powder printed with 10 g/100 ml sugar water binder fired at 400° F. for two hours in air, and then sintered at 1250° C. for thirty minutes in a protective atmosphere.

Although the invention has been described particularly above, with reference to specific materials, methods and amounts, the invention is only to be limited insofar as is set forth in the accompanying claims.

We claim:

1. A method for article fabrication in which a quantity of powder to be fabricated is brought into proximity with a binder comprising at least one carbohydrate, comprising:
   depositing layers consisting essentially of powder; and
   depositing alternating separate layers consisting essentially of binder,
   wherein said carbohydrate contains between 6 and about 900 carbon atoms.

2. The method of claim 1, wherein said carbohydrate is selected from the group consisting of monosaccharides, disaccharides, trisaccharides, polysaccharides and hydrolyzed starches.

3. The method according to claim 1, wherein the article contains powder particles selected from the group consisting of elemental metal, metallic alloy, a cermet, an intermetallic, a metal/ceramic composite and a pure ceramic.

4. The method according to claim 1, wherein the article fabrication is solid free form fabrication.

5. The method according to claim 4, wherein the solid free form fabrication is three-dimensional printing.

6. The method according to claim 4, wherein the solid free form fabrication is selective laser sintering.

7. The method according to claim 3, wherein the particles are fired, sintered and infiltrated in a single step.

8. The method according to claim 3, wherein the particles are fired, sintered and infiltrated in a sequence of at least two steps.

9. The method according to claim 3, wherein the resulting article contains between about 0.08–0.76 carbon weight percent after firing.

10. The method according to claim 3, wherein said binder is a liquid during the fabrication process.

11. The method according to claim 10, wherein said liquid is aqueous.

12. The method according to claim 10, wherein said liquid further comprises about 5–50 grams carbohydrate per 100 ml water.

13. The method according to claim 10, wherein said liquid further comprises about 5–30 grams carbohydrate per 100 ml water.

14. The method according to claim 10, wherein said liquid further comprises about 15 grams carbohydrate per 100 ml water.

15. The method according to claim 1 wherein said fabrication is a powder metallurgy process.

16. The method according to claim 1, wherein the layers consisting essentially of powder are whole layers, and
   wherein the layers consisting essentially of binder are selectively deposited layers.

17. A method for article fabrication in which a quantity of powder to be fabricated is brought into proximity with binder comprising at least one carbohydrate, comprising:
   depositing layers consisting essentially of powder; and
   depositing alternating separate layers consisting essentially of binder,
   wherein said carbohydrate is selected from the group consisting of monosaccharides, disaccharides, trisaccharides, polysaccharides and hydrolyzed starches.

18. The method according to claim 17, wherein the article contains powder particles selected from the group consisting of elemental metal, metallic alloy, a cermet, an intermetallic, a metal/ceramic composite and a pure ceramic.

19. The method according to claim 17, wherein the article fabrication is solid free form fabrication.

20. The method according to claim 19, wherein the solid free form fabrication is three-dimensional printing.

21. The method according to claim 19, wherein the solid free form fabrication is selective laser sintering.

22. The method according to claim 18, wherein the particles are fired, sintered and infiltrated in a single step.

23. The method according to claim 18, wherein the particles are fired, sintered and infiltrated in a sequence of at least two steps.

24. The method according to claim 18, wherein the resulting article contains between about 0.08–0.76 carbon weight percent after firing.

25. The method according to claim 18, wherein said binder is a liquid during the fabrication process.

26. The method according to claim 25, wherein said liquid is aqueous.

27. The method according to claim 25, wherein said liquid further comprises about 5–50 grams carbohydrate per 100 ml water.

28. The method according to claim 25, wherein said liquid further comprises about 5–30 grams carbohydrate per 100 ml water.

29. The method according to claim 25, wherein said liquid further comprises about 15 grams carbohydrate per 100 ml water.

30. The method according to claim 17 wherein said fabrication is a powder metallurgy process.

31. The method according to claim 17 wherein the layers consisting essentially of powder are whole layers, and
   wherein the layers consisting essentially of binder are selectively deposited layers.

* * * * *